US008588716B2

(12) United States Patent
Kursawe et al.

(10) Patent No.: US 8,588,716 B2
(45) Date of Patent: Nov. 19, 2013

(54) METHOD FOR SEARCHING FOR SIGNALS AMONG INTERFERENCE SIGNALS IN A MULTI-CHANNEL RADIO RECEIVER

(75) Inventors: Christian Kursawe, Straubing (DE); Thomas Reisinger, Regenstauf (DE); Jürgen Schmid, Regensburg (DE); Franz Stolz, Regensburg (DE)

(73) Assignee: Continental Automotive AG, Hannover (DE)

( * ) Notice: Subject to any disclaimer, the term of this patent is extended or adjusted under 35 U.S.C. 154(b) by 1564 days.

(21) Appl. No.: 11/910,617

(22) PCT Filed: Jan. 24, 2007

(86) PCT No.: PCT/EP2007/050681
§ 371 (c)(1),
(2), (4) Date: Oct. 4, 2007

(87) PCT Pub. No.: WO2007/096222
PCT Pub. Date: Aug. 30, 2007

(65) Prior Publication Data
US 2010/0029232 A1    Feb. 4, 2010

(30) Foreign Application Priority Data
Feb. 6, 2006   (DE) .................. 10 2006 005 284

(51) Int. Cl.
*H04B 1/18*    (2006.01)
(52) U.S. Cl.
USPC .................................... 455/161.3; 455/343.1
(58) Field of Classification Search
USPC ............... 455/41.2, 41.3, 161.3, 334, 343.1, 455/343.2, 343.4, 574; 340/438, 442, 340/539.1, 870.16
See application file for complete search history.

(56) References Cited

U.S. PATENT DOCUMENTS 5,752,183 A * 5/1998 Mueller et al. ............ 455/343.2
6,006,089 A   12/1999 Sasaki et al.
(Continued)

FOREIGN PATENT DOCUMENTS

EP    0926021 A2     6/1999
EP    1139591 A2 * 10/2001
(Continued)

OTHER PUBLICATIONS

English Translation of Japanese Office Action dated Dec. 18, 2009.

*Primary Examiner* — Quochien B Vuong
(74) *Attorney, Agent, or Firm* — Laurence A. Greenberg; Werner H. Stemer; Ralph E. Locher (57) ABSTRACT

In a method for searching for signals among interference signals in a multi-channel radio receiver, at least two different data signals are transmitted on at least one physical channel of a radio system to a common receiver. The search for a signal is initiated on any channel, starting with a sequential search of a useful signal by measuring the current signal strength in the form of the RSSI value; a search is made for a signal criterion of the signal and when said criterion has been identified, the measured RSSI value is compared with a predefined RSSI threshold value; if the RSSI threshold value is exceeded, the search for a signal is switched to a search for a data frame and if a data frame is found, the useful data is read; if no signal criterion is identified, if the RSSI threshold value is not exceeded and if no data frame is found, the procedure is interrupted and a new search operation is initiated once a new RSSI threshold value has been defined. The invention is particularly suitable for radio transmission systems in motor vehicles to implement RKE and TPMS functions and for multi-channel transmissions, used for example in remote metering and remote control systems.

9 Claims, 6 Drawing Sheets (56) References Cited

U.S. PATENT DOCUMENTS

| | | |
|---|---|---|
| 6,631,264 B1 | 10/2003 | Leickel et al. |
| 7,426,392 B2 * | 9/2008 | Hagin-Metzer et al. ...... 455/436 |
| 2003/0095030 A1 | 5/2003 | Greenwood |
| 2004/0132410 A1 | 7/2004 | Hundal et al. |
| 2004/0235439 A1 | 11/2004 | Husted et al. |

FOREIGN PATENT DOCUMENTS

| | | |
|---|---|---|
| GB | 2338866 A | 12/1999 |
| JP | 10163949 A | 6/1998 |
| JP | 2000332719 A | 11/2000 |
| JP | 200194505 A | 4/2001 |
| JP | 2001345724 A * | 12/2001 |

* cited by examiner

METHOD FOR SEARCHING FOR SIGNALS AMONG INTERFERENCE SIGNALS IN A MULTI-CHANNEL RADIO RECEIVER

BACKGROUND OF THE INVENTION

Field of the invention

The invention relates to a method for searching for signals among interference signals in a multi-channel radio receiver in which at least two different data signals are transmitted on at least one physical channel of a radio system to a common receiver.

Modern radio systems, in the field of motor vehicles for access control and tire pressure control for example, use a number of physical channels for data transmission. A physical channel is defined in such cases by at least one different parameter e.g. by the frequency, the modulation, possibly also the data rate or the protocol format. On the one hand different physical channels can be used for different functions, e.g. for a wireless central locking system, also known as Remote Keyless Entry (RKE) or a tire pressure checking system, also known as a Tire Pressure Monitoring System (TPMS). On the other hand the data for a function can, for reasons of redundancy, be transmitted on a number of physical channels, e.g. with a multi-channel system in which a multiple transmission of the same data at different frequencies occurs. On cost grounds it is advantageous, for receiving these functions with a number of physical channels, only to use one receiver unit. This receiver unit searches, typically sequentially, the physical channels for valid signals. This signal search occurs for example if the receiver is periodically activated for a short time to search for signals, in order to save power, a process which is also referred to by the term "polling". The criterion for a valid signal, the signal criterion, is based on the identification of one or more signal properties, e.g. the signal strength, which is usually characterized by the Radio Signal Strength Indicator (RSSI). Further signal properties are the data rate, the data encoding, e.g. Manchester encoding, the data sequences, e.g. "pattern" or "alternating bits", the modulation properties, e.g. FSK and/or the signal pattern, e.g. correlation to PN sequences in spread-spectrum systems. If the receiver identifies a valid signal criterion on a physical channel then the signal search is ended and the data frame search initiated in order to receive the useful data on the relevant physical channel.

The case can occur in which a signal criterion is identified incorrectly, although no valid signal is present. This so-called false alarm can for example be triggered by noise, but also by other signal sources or interferers.

This will be explained in more detail below with reference to FIGS. 1 and 2.

Figure 1:
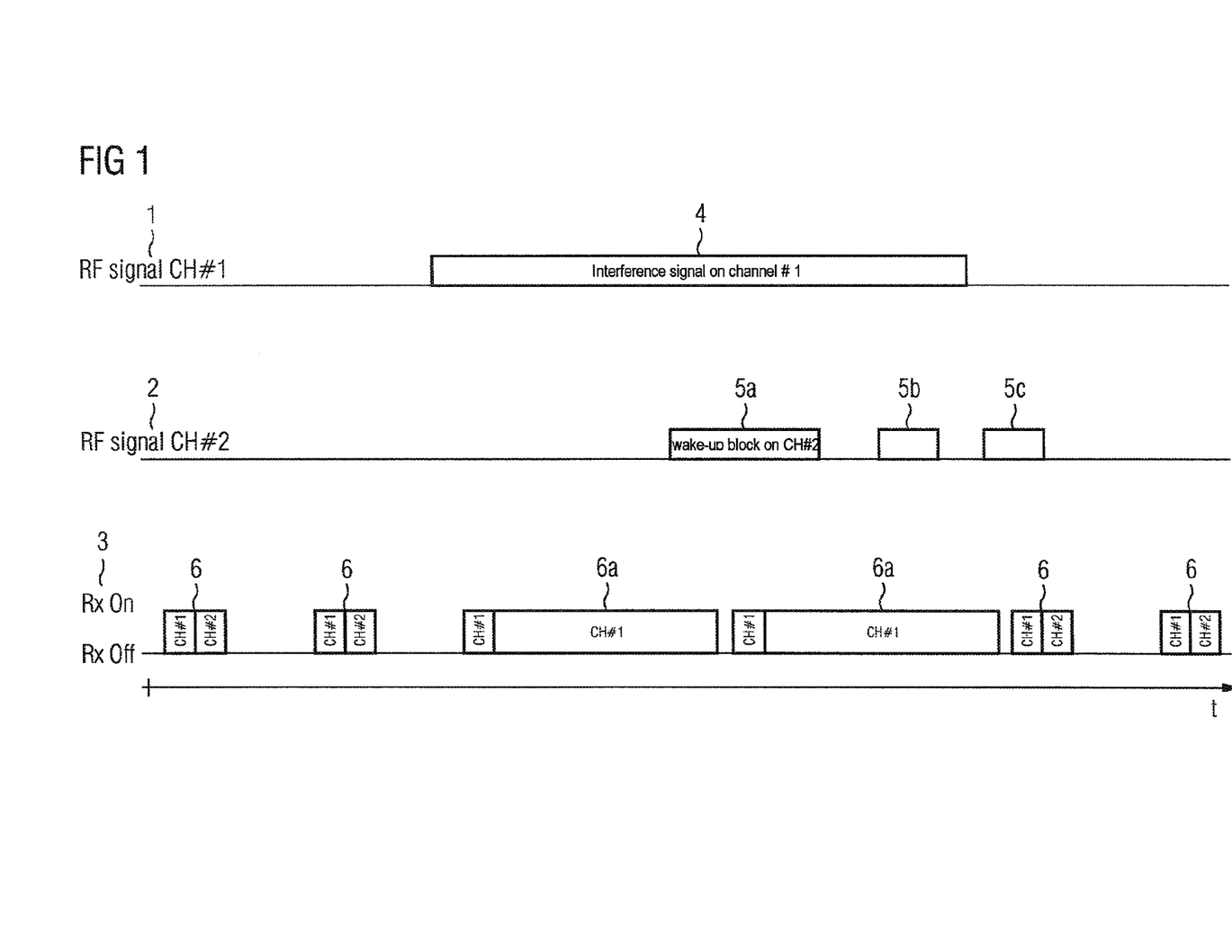
FIG. 1 the behavior according to the prior art when interference signals are received.

FIG. 1 shows a schematic diagram of transmission channels 1 and 2 with for example an interference signal 4 present on transmission channel 1 and useful signals 5a, 5b and 5c present on transmission channel 2, consisting of a wake-up block 5a, which is used to search for signals, and the useful data 5b and 5c, for which a data frame search is conducted. The figure shows the behavior of a receiver 3, on the one hand without the influence of interference signals 6 and on the other hand with the influence of interference signals 6a. For most of the time the receiver is busy undertaking a fruitless data frame search on channel 1 for signals 6a. The problem which now arises is that with constant false alarm signals on one or more physical channels, e.g. on channel 1 or 2, the receiver permanently attempts to read useful data 5b, 5c on the wrong channel by conducting an unsuccessful frame search while the remaining channels remain excluded from the signal search. The time until the detection of a false alarm depends on the protocol in such cases, in general however it is longer than the polling period. On the one hand, during the time prior to detection of a false alarm, useful signals 5b, 5c are not identified and thus not read on the remaining channels. On the other hand a periodic polling is suppressed by the constant activations of the receiver for data frame search, which means a significant increase in power consumption.

Figure 2:
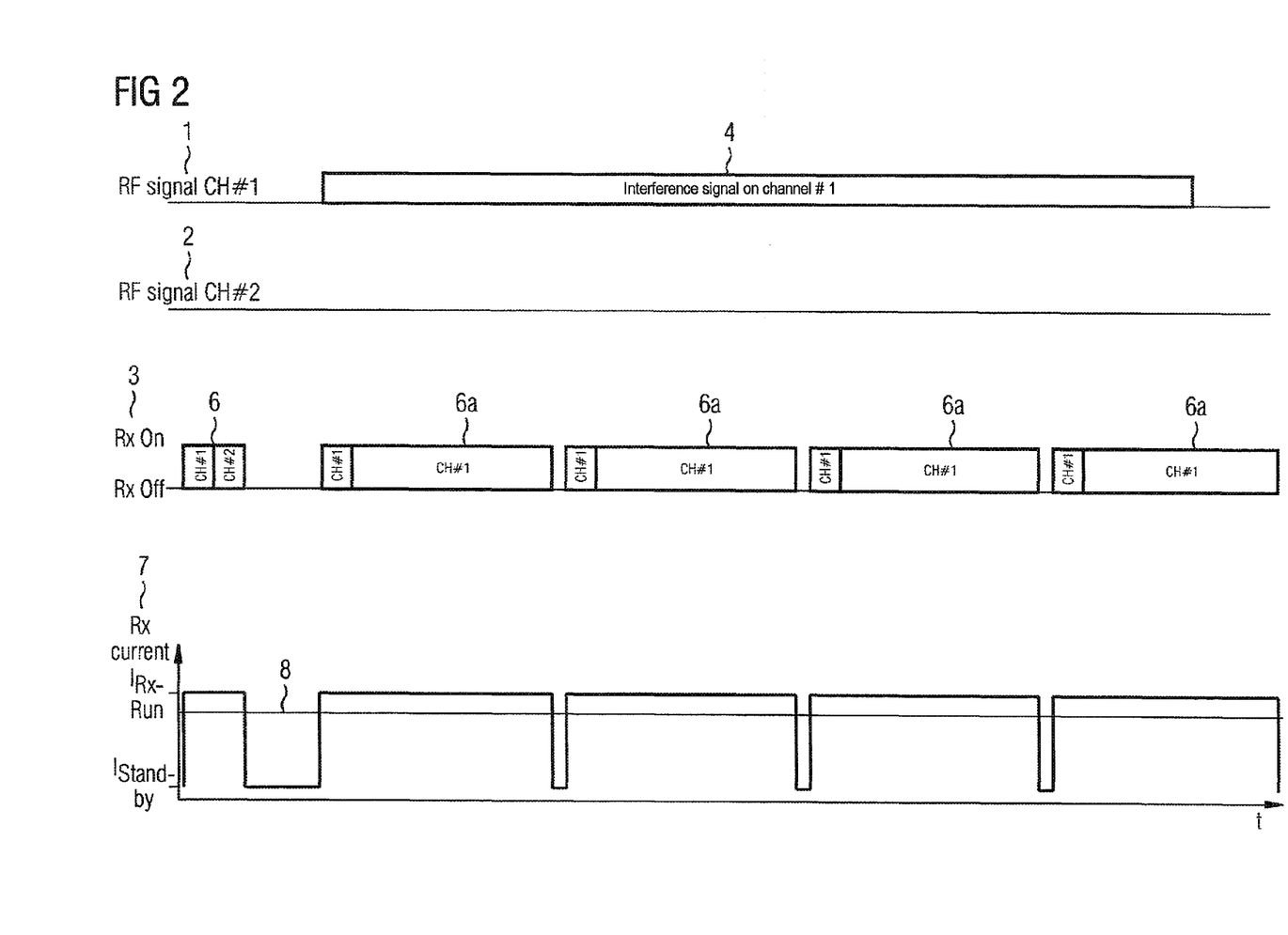
FIG. 2 the power consumption of the receiver with interference signals in the known method according to FIG. 1.

FIG. 2 shows a schematic diagram of the power consumption for a signal curve according to FIG. 1. The diagram shows the power consumption 7 as a function of time and the average power consumption 8, depending on whether a signal is being read via the receiver unit at the time or not. The average power consumed by the receiver is very high because of the constant data frame search and borders on the continuously active current IRx-Run.

The situations described in FIG. 1 and FIG. 2 primarily occur when interference signals are present, specifically ongoing interference signals which possess similar properties to the actual useful signal. These types or interference signals are referred to as critical interferers below.

The problem is generally independent of the useful signal level on the undisturbed channels, i.e. an interferer at the sensitivity limit can already represent a critical interferer.

A "Security system" is known from EP 0 926 021 A2. This relates on the one hand reducing the receiver sensitivity in a specific channel, on the other it relates to the complete setting of reception in a specific channel.

The disadvantage in this case is that these approaches to solutions are incomplete because only the activation of a counter measure is described but no mechanism is given with which receipt on the corresponding channels is made possible again.

BRIEF SUMMARY OF THE INVENTION

The underlying object of the present invention is thus to propose a method for secure data receipt of radio signals, with which, by comparison with the prior art, improved distinction between interference signals and useful signals can be achieved.

In accordance with the invention this object is achieved by a method with the features of claim 1. Advantageous embodiments and developments, which can be used either individually or in combination, are the object of the independent claims.

The invention describes a method with which the false-alarm signals of critical interferers can be bypassed or at least significantly reduced and thereby the reliability and availability of the data transmission when critical interferers are present can be greatly increased, as well an increased receiver power consumption suppressed.

The inventive method comprises the following steps:
The search for signals on a specific channel is considered, this typically being a component of a sequential search on a number of channels;
A search is made for a signal criterion and the RSSI value for the channel x is measured;
On detection of a signal criterion the measured RSSI value is compared to the current RSSI threshold value;

If a signal criterion is not identified the search for signals is continued;

If the RSSI threshold value is exceeded the system identifies the presence of a useful signal; The receiver changes from the signal search to the data frame search;

If the value falls below the RSSI threshold value the system identifies the presence of an interference signal, After the identification of an interference signal the RSSI threshold value is adapted to the interference source and the signal search is continued;

On successful data frame search the useful data is read and

If the data frame search is not successful an interference source is identified and the RSSI threshold value is adapted to the amplitude of the interference source.

The benefits resulting from the invention are produced by an adaptive arrangement of the threshold value in relation to the interference signal. This results in fast regulation, a short response time and also continued availability of the channel for a useful signal>interference signal. A further advantage is low power consumption in the disturbed environment since, when an interferer is present, regulation of the threshold value means that no unnecessary search for useful signals is undertaken.

Further details and advantages of the invention are explained with reference to the drawings.

DESCRIPTION OF THE INVENTION

In the description of a preferred embodiment of the present invention below the same reference symbols refer to the same or comparable components.

Figure 3:
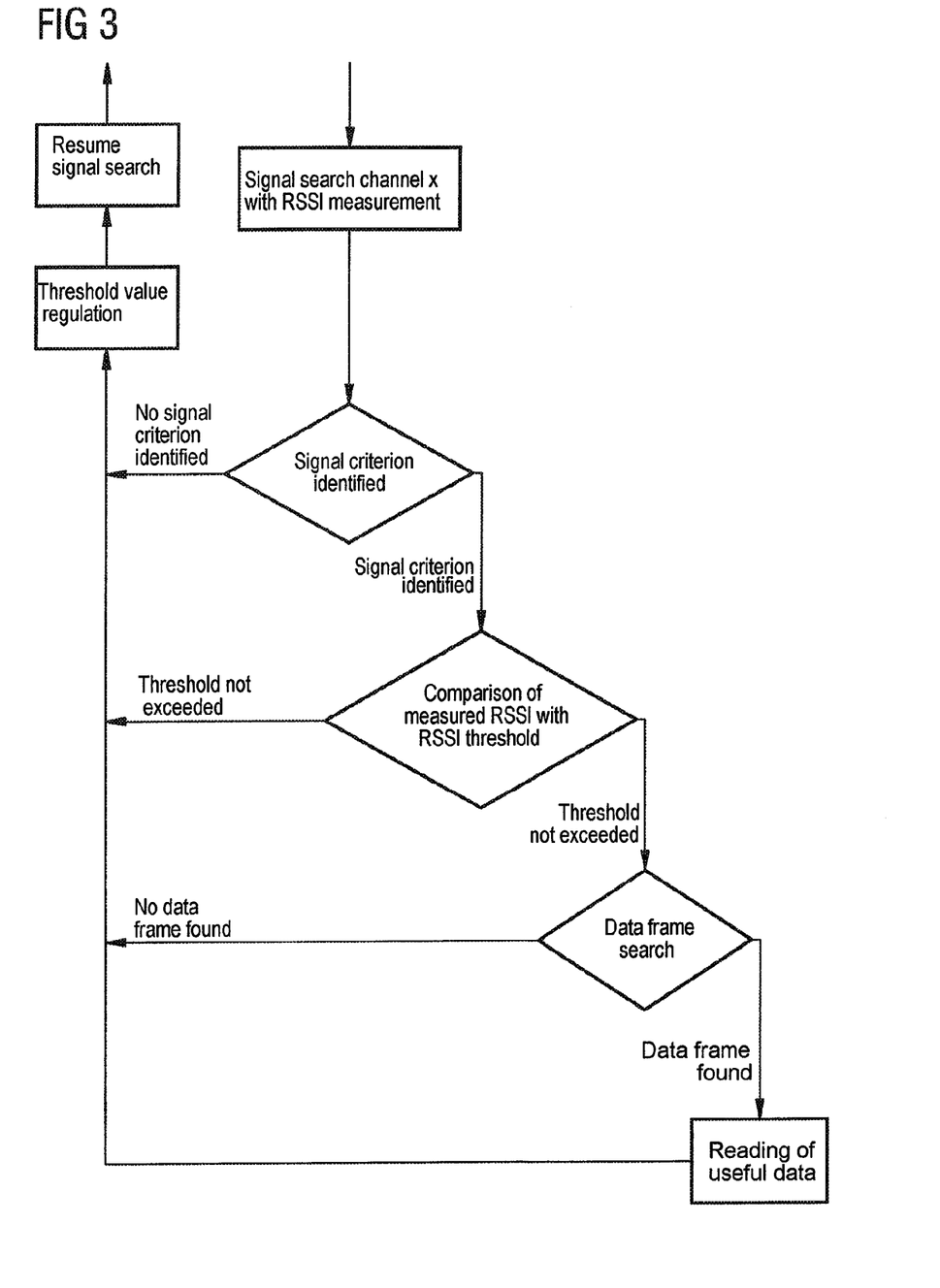
FIG. 3 a flowchart for execution of the inventive method.

FIG. 3 shows a schematic flow diagram of the inventive method for data transmission with radio systems, with the following steps:

The search for signals on a specific channel x is considered, which is typically a component of a sequential search on a number of channels. For example x could be the first channel for a sequential search of 2 channels.

A search is made for a signal criterion, e.g. for a bit pattern with alternating bits. Simultaneously the RSSI value for the channel x is determined.

If a signal criterion was identified the measured RSSI value is compared to a current RSSI threshold value in the channel x.

If no signal criterion was identified, the search for signals is continued (e.g. in the next channel x+1), after the threshold value for the channel x has been updated in accordance with a regulation algorithm. If a signal criterion was not identified the threshold value would typically be reduced, e.g. through immediate deletion or step-by-step withdrawal of the threshold value. The precise regulation algorithm can depend on a number of peripheral conditions, e.g. on the protocol structure.

If the threshold was exceeded during comparison of measured RSSI value and current RSSI threshold value, it is assumed that a valid signal is actually present and the receiver switches from the signal search to the data frame search on channel x.

If the threshold was not exceeded during comparison of measured RSSI value and current RSSI threshold value, it is assumed that a "critical interferer" is present and—after updating of the RSSI threshold—the signal search is continued. It is important for the threshold value to be updated in this case so that it is adapted to the level of the "critical interferer". Typically the threshold will be selected so that it is equal to the measured RSSI value plus a buffer, e.g. 6 dB. The buffer advantageously orients itself to the necessary S/N ratio for receiving.

If the data frame search is successful the useful data is read. After the receipt of data frames has ended the threshold can be updated again.

If the data frame search remains unsuccessful, it must again be assumed that there is a critical interferer and the threshold value regulation is undertaken in a similar way to the updating of the RSSI threshold already mentioned.

The inventive method uses at least one of the following features:

Deactivation of the disturbed channel or ignoring the signals in this channel

Changing the search sequence in order to give precedence to non-disturbed channels Generally searching through all channels with subsequent classification of the quality of the signal detection on the different channels and deciding on the channel with the best signal quality.

Reduction of the sensitivity of the receiver, whereby the value of the reduction can be fixed or follows an algorithm.

Setting an RSSI threshold value which can either be fixed or which follows an algorithm.

Setting an "intelligent" RSSI threshold value which is oriented adaptively to the interference level. This feature in particular leads to an especially advantageous mechanism against critical interferers.

Figure 4:
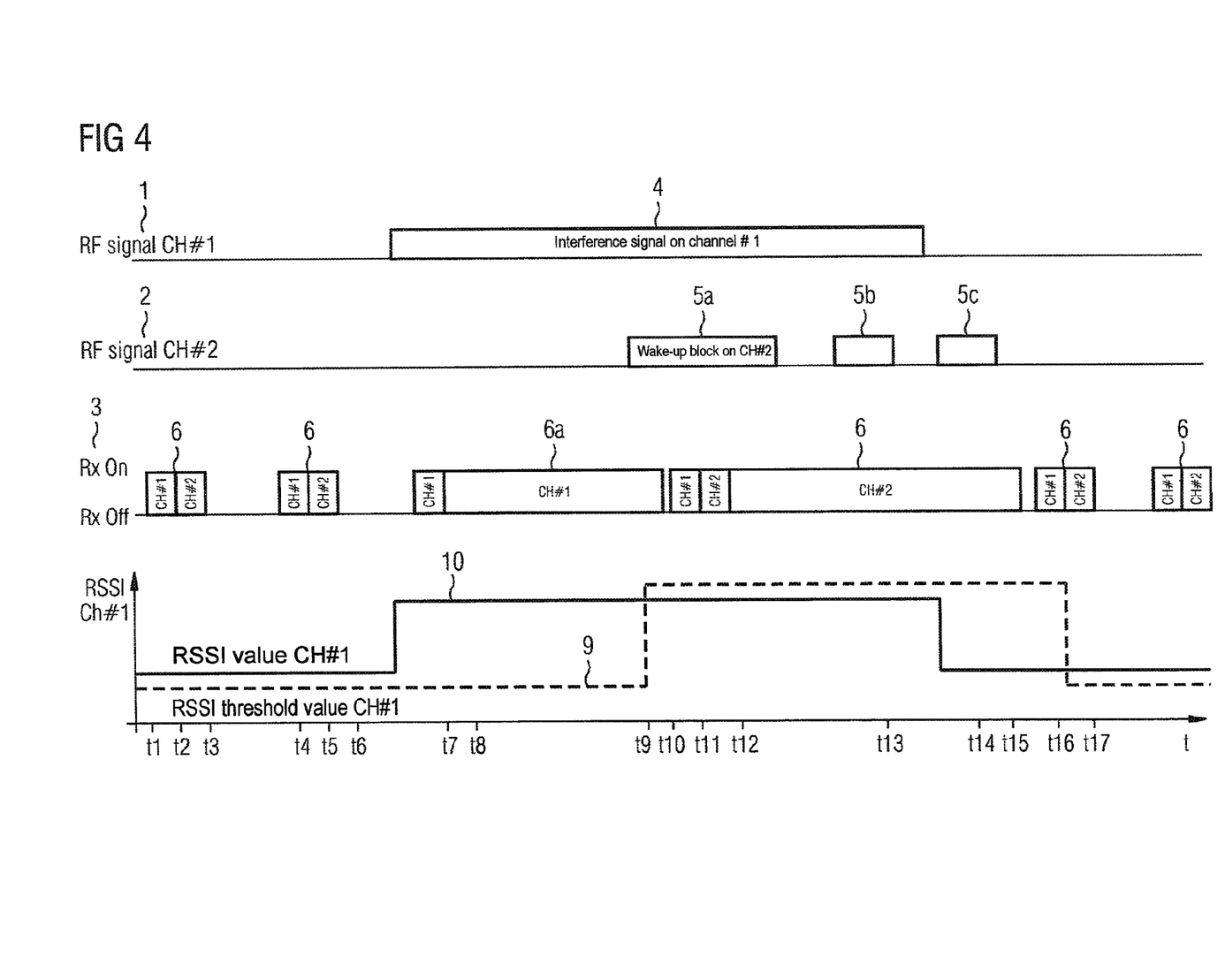
FIG. 4 the inventive method based on a two-channel system with adapted RSSI threshold value.

FIG. 4 is a schematic diagram, similar to the signal waveform shown in FIG. 1, of polling with signal search for 2 channels 1 and 2, with a critical interferer 4 occurring on channel 1, whereas a useful signal 5b, 5c is to be received on channel 2. It can be seen that the threshold value regulation adapted to the interferer 4 prevents "hanging" on channel 1 and the useful signal 5b, 5c on channel 2 can be successfully received on channel 2. The diagram also shows the current RSSI threshold value 9 and the measured RSSI value 10.

Furthermore a typical temporal execution sequence for signal detection using the inventive method is shown:

t1-t2: Signal search on channel 1 and RSSI measurement=>no signal criterion identified.

t2-t3: Signal search on channel 2 and RSSI measurement=>no signal criterion identified.

t7-t8: Signal search on channel 1 and RSSI measurement.

t8: Signal criterion identified and measured RSSI value 10 greater than the RSSI threshold value 9=>data frame search.

t8-t9: Data frame search

I t9: No data frame found=>RSSI threshold value 9 adapted to the measured RSSI value 10 of the interference signal 4 using an algorithm if necessary.

t10-t11: Signal search of channel 1 and RSSI measurement.

t11: Signal criterion identified, however measured RSSI level 10 is less than RSSI threshold value 9=>immediate continuation of the signal search on channel 2 and no data frame search on channel 1.

t11-t12: Signal search on channel 2 and RSSI measurement.
t12: Signal criterion identified and measured RSSI value 10 greater than the RSSI threshold value 9=>data frame search.
t13: Data frame found=>read useful data 5b, 5c.
t13-t14: Read useful data 5b, 5c.
t15-t16: Signal search on channel 1 and RSSI measurement=>no signal criterion identified=>adapt RSSI threshold value 9 for channel 1.
t16-t17: Signal search on channel 2 and RSSI measurement.

Figure 5:
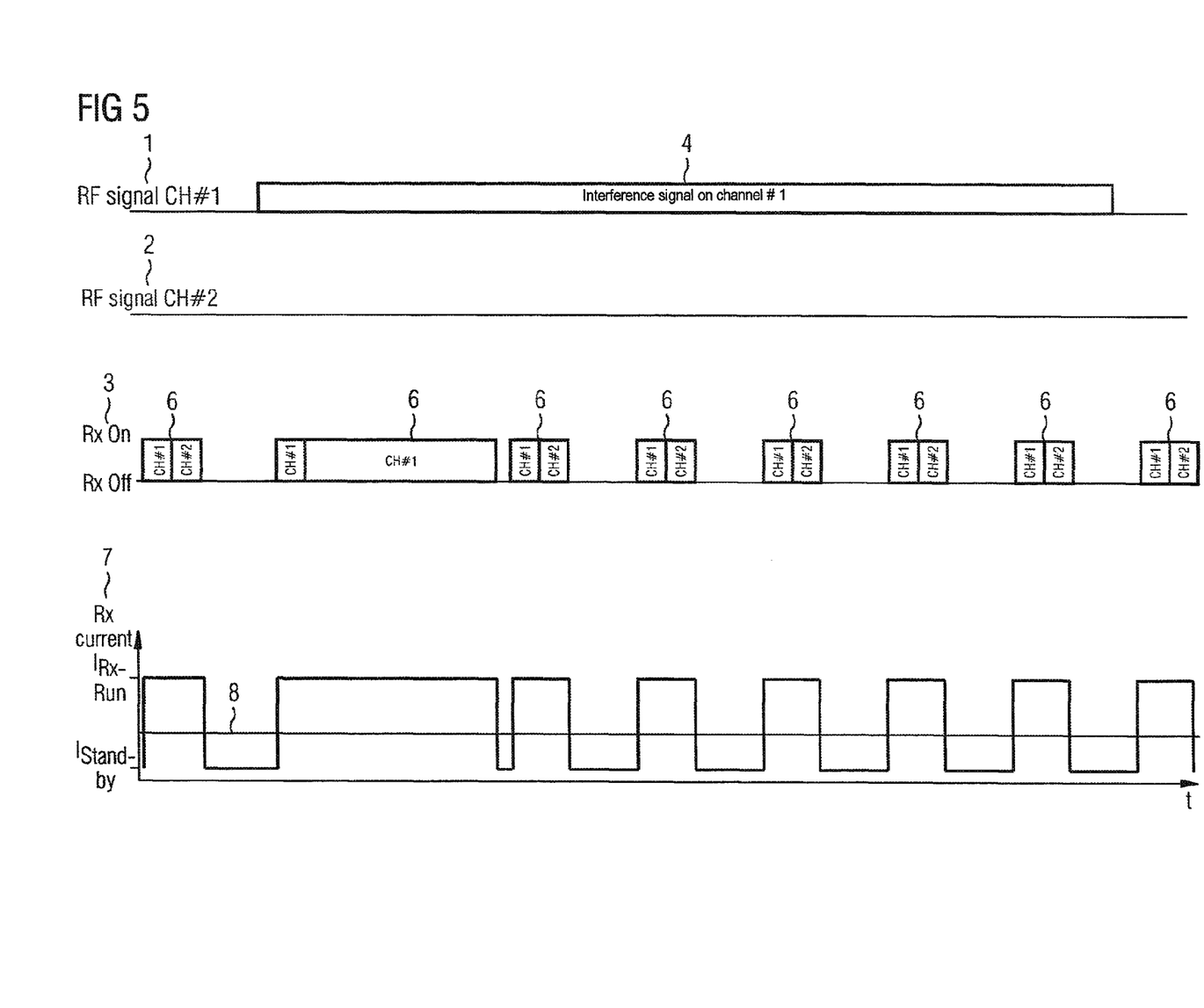
FIG. 5 the power consumption for a two-channel system.

FIG. 5 shows the power consumption for the flowchart shown in FIG. 4. It can be seen that the threshold value regulation adapted to the interferer 4 prevent a permanent "hanging" on channel 1 and thus the power consumption 8, ignoring an initial detection of the critical interferer 4, does not rise by comparison with the non-interference case.

Figure 6:
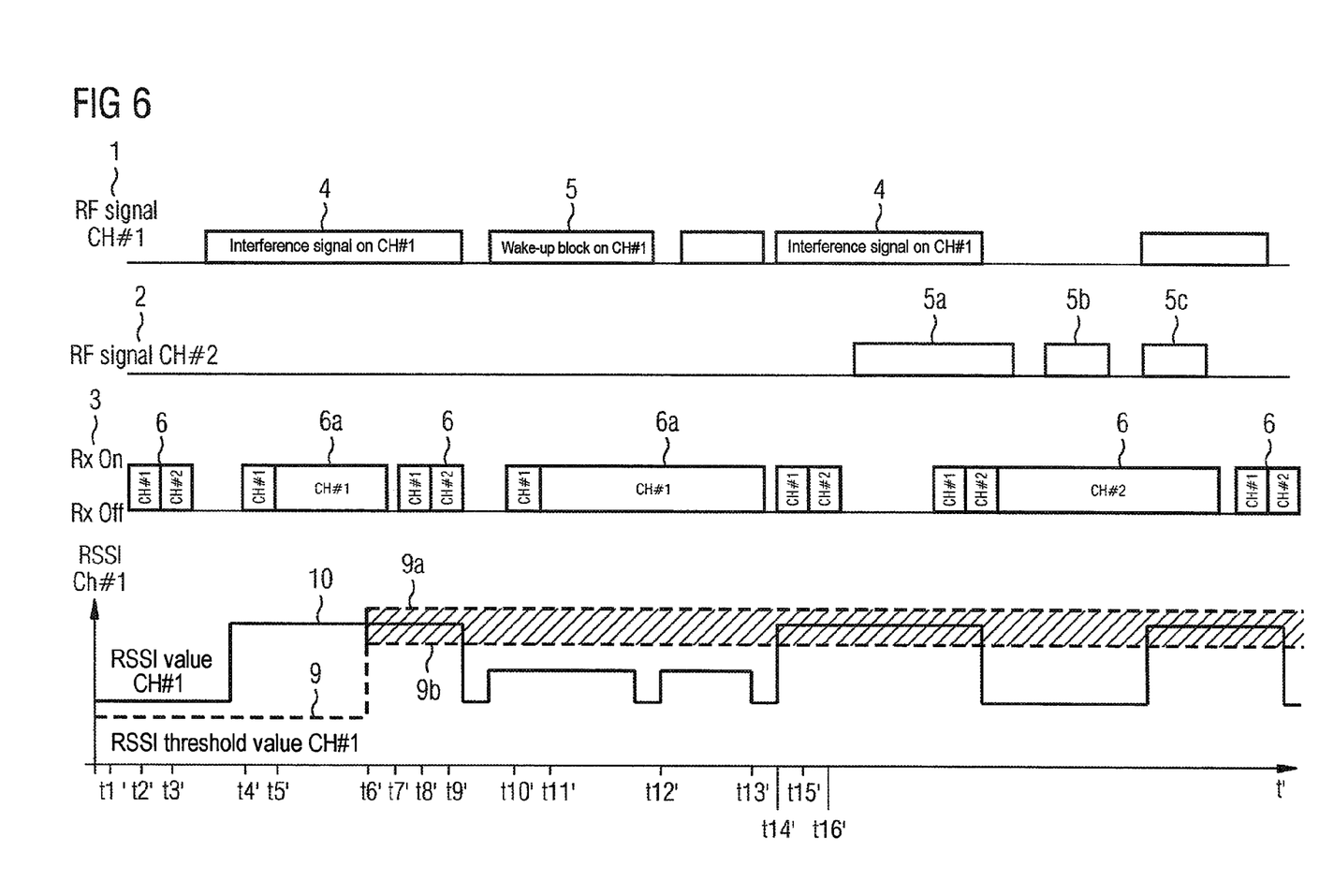
FIG. 6 the inventive method based on a two-channel system according to FIG. 4 with adapted RSSI threshold value range.

FIG. 6, in a similar manner to FIG. 4, shows a schematic diagram of a polling with signal search for 2 channels 1 and 2, with a critical interferer occurring on channel 1, whereas on channel 2 the useful signal 5b, 5c is to be received. It can be seen that the threshold value regulation adapted to the interferer 4 prevents "hanging" on channel 1 and the useful signal can be successfully received. The diagram also shows the current RSSI threshold value 9 and the measured RSSI value 10.

Furthermore a typical temporal execution sequence for signal detection using the inventive method is shown:
t1'-t2': Signal search of channel 1 and RSSI measurement=>no signal criterion identified.
t2'-t3': Signal search of channel 2 and RSSI measurement=>no signal criterion identified.
t4'-t5': Signal search on channel 1 and RSSI measurement.
t5': Signal criterion identified and measured RSSI value 10 greater than the RSSI threshold value 9=>data frame search.
t5'-t6': Data frame search
t6': No data frame found=>RSSI threshold value 9 adapted to the measured RSSI value 10 of the interference signal 4 using an algorithm if necessary.
t7'-t8': Signal search on channel 1 and RSSI measurement.
t8': Signal criterion identified, measured RSSI level 10 lies within the RSSI threshold value window 9a, 9b=>immediate continuation of the signal search on channel 2 and no data frame search on channel 1.
t8'-t9': Signal search on channel 2 and RSSI measurement=>no signal criterion identified.
t10'-t11': Signal search on channel 1 and RSSI measurement.
t11': Signal criterion identified and measured RSSI value 10 lies outside the RSSI threshold value window 9a, 9b=>data frame search.
t12': Data frame found=>read useful data 5b, 5c.
t12'-t13': Read useful data 5b, 5c.
t14'-t15': Signal search on channel 1 and RSSI measurement.
t15': Signal criterion identified, measured RSSI level 10 lies within of the RSSI threshold value window adapt 9a, 9b for channel 1.
t16'-t17': Signal search on channel 2 and RSSI measurement=>no signal criterion identified.

The present invention is especially suitable for radio transmission systems in motor vehicles for implementing the RKE and TPMS functions, and for multi-channel transmission, as are also to be found in remote-metering and remote-control systems.

The invention claimed is :

1. A method for searching for signals among interference signals in a multi-channel radio receiver in which at least two different data signals are transmitted on at least one physical channel of a radio system to a common receiver, the method which comprises:
    starting from a sequential search for a useful signal, initiating a signal search on any given channel by measuring a current signal strength to determine a measured RSSI value;
    searching for a signal criterion for the useful signal being sought on the given channel and, after the signal criterion is identified, comparing the measured RSSI value with a predetermined RSSI threshold value;
    if the measured RSSI value exceeds the RSSI threshold value, switching from a signal search to a data frame search on the given channel and, if the data frame search is successful, reading the useful data; and
    if no data frame is found on the given channel, aborting the search on the given channel, defining a new RSSI threshold value for the given channel, and initiating a new search process.

2. The method according to claim 1, which comprises, after receipt of the data frame has ended, updating the RSSI threshold value.

3. The method according to claim 1, which comprises deactivating or ignoring a channel, in which interference signals are identified.

4. The method according to claim 1, which comprises changing a sequence in which the channels are searched.

5. The method according to claim 1, which comprises searching all channels and subsequently classifying the channels according to a quality of signal detection on the different channels.

6. The method according to claim 1, which comprises reducing a sensitivity of the receiver.

7. The method according to claim 1, which comprises adapting the RSSI threshold value to an interference level determined in the process.

8. The method according to claim 1, which comprises defining the RSSI threshold value as a threshold value range with an upper boundary and a lower boundary.

9. The method according to claim 1, wherein the signal criterion is a bit pattern.

* * * * *